United States Patent Office 2,776,212
Patented Jan. 1, 1957

2,776,212

PROCESS OF MAKING IMITATION NUTMEATS

Harriett Andregg, Chicago, Ill., assignor to Swift & Company, Chicago, Ill., a corporation of Illinois No Drawing. Application June 11, 1953,
Serial No. 361,063

5 Claims. (Cl. 99—14)

The present invention relates generally to new food products and the method of making them. It has as its primary object the production of proteinaceous nutmeat products.

Proteinaceous fibers have been formed in the past from proteinaceous material such as casein, soybean protein, corn gluten, etc. The general method of producing such fibers comprises the preparation of an alkaline aqueous colloidal solution of proteinaceous material. The pH of such a solution is then properly adjusted, depending upon the source of protein utilized. For example, in the instance where casein is used, the pH is adjusted and maintained at approximately 6.0–7.5. To such a solution sufficient fat may be added for the purpose of forming a homogenous mixture. The resultant mixture is then extruded through an orifice into a precipitating bath. This bath is normally an acid-salt solution which causes the extruded proteinaceous material to precipitate in fiber form. These fibers can be extremely thin and resemble very fine threads.

In forming such proteinaceous fibers there are several different methods which may be followed. Such methods are generally known and have been used over the past years in making different synthetic products from proteinaceous material. The source of material used may be that of either animal or vegetable origin.

The present invention concerns the further treatment of proteinaceous fibers formed in the manner above described or in any well-known and suitable manner. By treating such fibers in the manner hereinafter set forth, it is possible to produce a nutmeat-like product of comparatively low cost. The manner of treatment to be described is also capable of producing a nutmeat-like product which may be used as a complete substitute for naturally occurring nutmeats. This product also has all of the desirable features of natural nutmeats with respect to taste, texture, appearance, and utility. Such a product has a texture that is crisp and yet not brittle.

Generally, the invention comprises treating proteinaceous fibers in the following manner, though not necessarily in the order in which the specific steps appear:

The fibers are first cut into comparatively small pieces, following which the pH of the cut fibers is adjusted to control the desired texture, etc. The cut fibers are then subjected to a fusing action whereby they are at least partially joined together so as to allow a subsequent reduction of the fused mass into relatively small particles. Following the reduction of the fibers, they are subjected to a dehydrating and plasticizing treatment. The reduced fibers are then in the proper condition to have flavoring added and thereby the final nutmeat-like product completed.

As the fibers are extruded in the form of extremely fine threads, it is necessary, in order to produce a product of sufficient particle size, to at least partially fuse the extruded fibers together and thereby form a more compact mass. This mass may then be broken up either by grating, chopping, shredding, or any other suitable manner, so as to form the desired particle size necessary in the finished product. In preparation for the fusing of the fibers, at least two separate procedures may be followed. The fibers may either be cut into comparatively small pieces and thereafter fused, or the fibers may be bunched together without cutting and thereby form a mass which also may be fused. If the latter course of action is followed it has been found that the fusing is not carried out to such a complete degree as when the fibers are cut into small pieces. By forming the small pieces, a more uniform pattern of fibers may be used during the fusing step, thereby allowing more complete fusing between the individual fibers. Both methods may be used and desirable results may be obtained in either case, but of the two, the method most preferred is that wherein the fibers are cut. The cutting may be accomplished by any suitable means, either by hand or machinery.

Following the cutting or bunching step, it is considered preferably to adjust the pH of the fibers to within the preferred range. A pH within the range of 4.5 to 7 may be used, though the most preferable pH will vary depending upon the source of the proteinaceous material. For example, the desirable range for casein fibers is from approximately 4.5 to 6.3. Below a pH of 4.5 the casein fibers are considered to be too tough to be acceptable for such a product. Above a pH of 6.3 it is considered that the fibers are too soft and therefore are not desirable to be used as a substitute for nutmeats. In the case of soybean fibers, the desirable pH range is approximately 5.5 to 6.9. Here again, fibers having a pH higher than 6.9 are considered to be too soft, while those having a pH of less than 5.5 are found to be very difficult to fuse. While the preferable ranges may vary depending upon the source material utilized, it has nevertheless been found that the general pH range of 4.5 to 7, when followed, will produce substantially desirable properties in the proteinaceous material to be used as a substitute for nutmeats. The adjustment of the pH value at this point of the operation is not necessarily required. The purpose of adjusting the pH is to produce a product which has the proper texture suitable to be used in making imitation nutmeats. It is preferable to adjust the pH at this point in the operation, but it has been found that the pH may be adjusted at any other point in the operation prior to the addition of the desired flavoring.

In following the preferred method, the fibers at this point of the operation would be in small pieces and adjusted to the proper pH. In order to produce sufficiently large particles of the finished product, it is necessary at this point to fuse the fibers together, at least partially, so as to introduce sufficient body into the proteinaceous material to allow subsequent grating, shredding, or chopping. As stated above, the fibers may be fused together, either in the form of small individual pieces or in the form of long continuous pieces bunched into a relatively compact group. In accomplishing the fusing of the fibers they may be placed in thin layers, in the instance where they are in small pieces, on a pan in a hot oven for a short period of time. In the instance where casein fibers are utilized, fusing is accomplished by placing the fibers in an oven held at 130° C. for approximately 20 minutes. The final temperature of the fused fibers will be approximately 80° C. Complete fusing is not absolutely necessary. It is only necessary to partially fuse to ensure that the resultant mass exhibits sufficient bulk to allow reduction in size. No particular method of fusing is necessary as all that is required is the formation of a sufficient bond between the fibers so that they form a self-sustaining or integrally connected or bonded mass.

The fused fibers are then grated, chopped, or shredded, depending upon the finally desired particle size. Coconut meat is normally available in the shredded form of comparatively long, thin threads, or is available in the small flaky grated variety to allow its use under various conditions. The fused mass formed by the teachings of the present invention may also be treated so as to produce the various particle size and thereby be capable of use under the same circumstances as coconut meat. The grating or shredding may be carried out by hand or by machinery and may be done in any other known manner.

Following the grating, it has been found desirable to dehydrate and plasticize the proteinaceous particles in order to supply them with the proper softness normally found in nutmeats. This may be accomplished by soaking the grated or shredded fibers in a humectant or any material capable of dehydrating the fibers and still supplementing the fibers with material capable of keeping them pliable and comparatively soft. The use of glycerine produces highly desirable results. The glycerine removes the water by replacing it in the fibers and thereby allows the fibers to keep their natural pliability. If the fibers were merely dried, the resultant product would be flinty and brittle. If they are not dried, they are soft and chewy. It is therefore necessary to replace the water with a material which will not leave the fibers of its own accord under changing conditions with which the fibers come into contact.

Following the dehydrating and plasticizing treatment the fibers are drained of the excess dehydrating and plasticizing agent and are then flavored with the desired artificial flavoring to produce the desired flavor of pecans, walnuts, Brazil nuts, coconut, etc. The resultant product is not only identical to naturally occurring nutmeats in texture and flavor but is also identical to such meat in appearance. A highly desirable product is thereby produced in a simple manner and at low cost.

The following examples are set forth as illustrative only of the present invention and are not to be construed as limiting thereto:

*Example I*

Casein fibers containing approximately 10 percent fat were formed in the conventional manner by extrusion from a homogenous mixture into an acid-salt precipitating solution. The excess acid was then washed out of the fibers and the pH of the fibers so formed was approximately 5.4. The fibers were cut into half inch pieces and the pH was adjusted to approximately 6.1, using citric acid and disodium phosphate. The fibers were then centrifuged to remove the excess moisture, following which they were placed in thin layers on a shallow pan. Fusing of the fibers was then accomplished by subjecting them to a temperature of 130° C. in an oven for approximately 20 minutes. They were then removed from the oven, cooled, shredded, and soaked in glycerine for two hours. The amount of glycerine utilized was approximately based on the ratio of four parts glycerine to one part fiber by weight. The fibers were dehydrated and plasticized as a result of this treatment, and some of the excess glycerine was drained from the fibers by placing them on a screen. The remaining excess glycerine was removed by centrifuging. The treated fibers were then flavored with an artificial coconut flavoring and the resultant product exhibited the appearance and texture of naturally occurring shredded coconut meat.

*Example II*

Soybean fibers were made containing no fat and having a pH of about 6.3. These fibers were cut into half-inch pieces and fused in an oven at a temperature of 130° C. for approximately 20 minutes. They were then cooled and grated, following which they were dehydrated and plasticized by soaking in glycerine for approximately two hours. The amount of glycerine utilized was based on the approximate ratio of four parts glycerine to one part fiber by weight. A portion of the excess glycerine was removed by draining through a screen while the remaining excess was removed by centrifuging. The treated fibers were then flavored with an artificial walnut flavor. Even though no fat was incorporated in the starting fibers, the finished product exhibited a nutmeat-like appearance and texture.

*Example III*

Soybean fibers containing 5 percent fat and at a pH of approximately 6.3 were treated in the same manner as set forth in Example II. The resultant product exhibited the same texture and appearance of naturally occurring grated nutmeat.

As can be seen from the examples, a considerable amount of variation in procedure may be resorted to in carrying out the teachings of the present invention. It is not required that fat be used in the starting material, although the use of such an ingredient is preferred. The fused fibers may clearly be shredded or chopped instead of grated, depending upon the physical form of the finished product desirable. The fibers may be fused together without the preliminary step of cutting them into relatively small pieces. Such fusing may be accomplished merely by bunching the fibers in any desirable manner so that the individual sections of the fibers are in sufficiently close proximity to one another to allow partial fusing to take place. The amount of glycerine utilized may vary and no particular amount has been found preferable as long as that which is used is sufficient to adequately dehydrate and plasticize the fiber particles so that they resemble the flexibility, texture, and appearance of nutmeats.

Obviously, many modifications and variations of the invention as hereinbefore set forth may be made without departing from the spirit and scope thereof, and therefore only such limitation should be imposed as are indicated in the appended claims.

I claim:

1. In the method of manufacturing a food product the steps comprising: forming proteinaceous fibers by extrusion of a colloidal solution of proteinaceous material into an acid salt precipitating bath; fusing the fibers so formed by the application of heat so as to form a fiber mass; reducing said fiber mass into relatively small particles, the size of said particles being relatively small with respect to the initial size of said fiber mass; dehydrating and plasticizing said particles by replacing the water contained therein with a plasticizing agent; and adjusting the pH of said particles intermediate of any two of the steps set forth, said pH being adjusted so as to fall within the approximate range of 4.5 to 7.

2. A process of manufacturing a nutmeat-like product from manufactured protein fibers which comprises: forming said fibers by the extrusion of a colloidal homogenous mixture of proteinaceous material and fat into a precipitating bath; placing the fiber strands so formed in close proximity thereto; partially fusing said strands together and thereby forming an integrally connected fiber mass; reducing said mass into relatively small particles; dehydrating and plasticizing said particles; and, thereafter, flavoring said particles in any desired manner.

3. The method of making synthetic nutmeats which comprises forming proteinaceous material fibers; cutting said fibers into small pieces; adjusting the pH of said cut fibers whereby the texture of said fibers is improved; subjecting said cut fibers to conditions whereby the said fibers are partially fused; grating said fused fibers; dehydrating and plasticizing said grated fibers; and thereafter flavoring the so-treated fibers.

4. In the method of manufacturing a food product the steps comprising: forming casein fibers of a pH of from 4.5 to 6.3; fusing said fibers into a mass; reducing said mass into a number of relatively small particles; dehydrating and plasticizing said small particles; and, thereafter, flavoring said particles.

5. A process of manufacturing a food product which comprises: forming fibers made from the protein of soybean; adjusting the pH of said fibers to within the range of 5.5 to 6.9; fusing said fibers into a mass; reducing said mass into a number of relatively small particles; dehydrating and plasticizing said small particles; and, thereafter, flavoring said particles.

References Cited in the file of this patent

UNITED STATES PATENTS

| | | |
|---|---|---|
| 1,774,110 | Sloat | Aug. 26, 1930 |
| 2,211,961 | Meigs | Aug. 20, 1940 |
| 2,560,621 | Wrenshall | July 17, 1951 |
| 2,682,466 | Boyer | June 29, 1954 |

OTHER REFERENCES

"New Uses for Glycerine," by Leffingwell et al., The Manufacturing Confectioner, December 1938, page 19.